United States Patent [19]
Hill

[11] 4,153,046
[45] May 8, 1979

[54] PLASTIC, HEATED WATER CONTAINER FOR TAPE MACHINES

[75] Inventor: Forrest G. Hill, East St. Louis, Ill.

[73] Assignee: The Marsh Stencil Machine Co., Belleville, Ill.

[21] Appl. No.: 850,211

[22] Filed: Nov. 10, 1977

[51] Int. Cl.² ............................................. A47J 27/00
[52] U.S. Cl. .................................... 126/390; 126/391
[58] Field of Search ................ 126/390, 391; 226/135; 118/264, 429

[56] References Cited
U.S. PATENT DOCUMENTS

| | | | |
|---|---|---|---|
| 2,343,470 | 3/1944 | Nast | 126/390 |
| 2,635,173 | 4/1953 | Radi | 126/390 X |

*Primary Examiner*—Edward G. Favors
*Attorney, Agent, or Firm*—Rogers, Eilers & Howell

[57] ABSTRACT

A plastic, heated water tank for gummed tape dispensing machines that resists corrosion, is easy to clean, reduces the likelihood of burning the user, and yet affords good heat transfer from an external heating element into the water in the tank. It provides as an insert in the plastic tank a tubular metal heat transmission member with special sealing means between the plastic and the ends of the metal member. The sealing means prevent leakage from the container around the ends of the metal member that could result from differences in expansion rates of the plastic and the metal.

10 Claims, 8 Drawing Figures

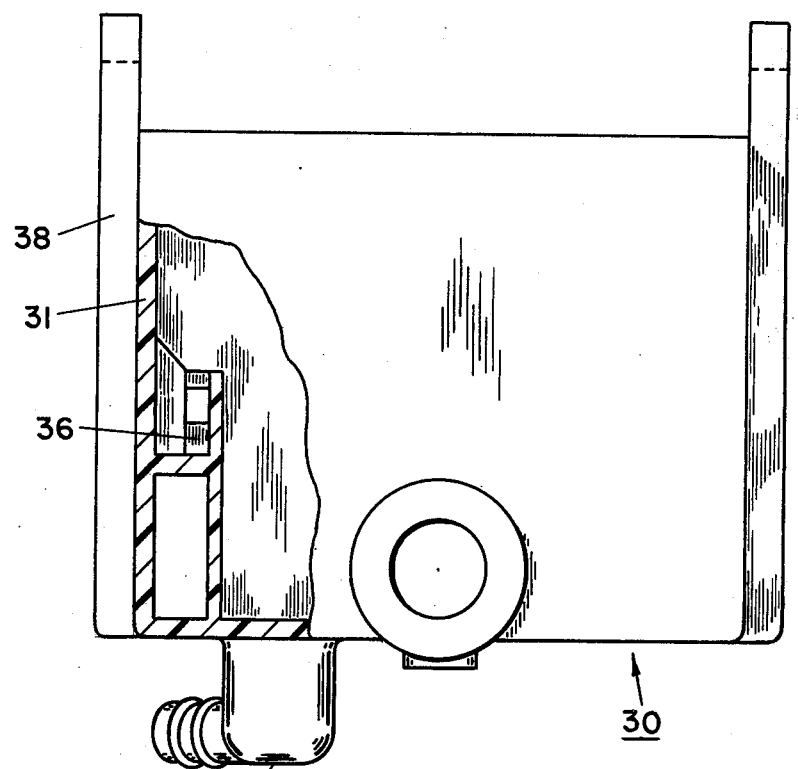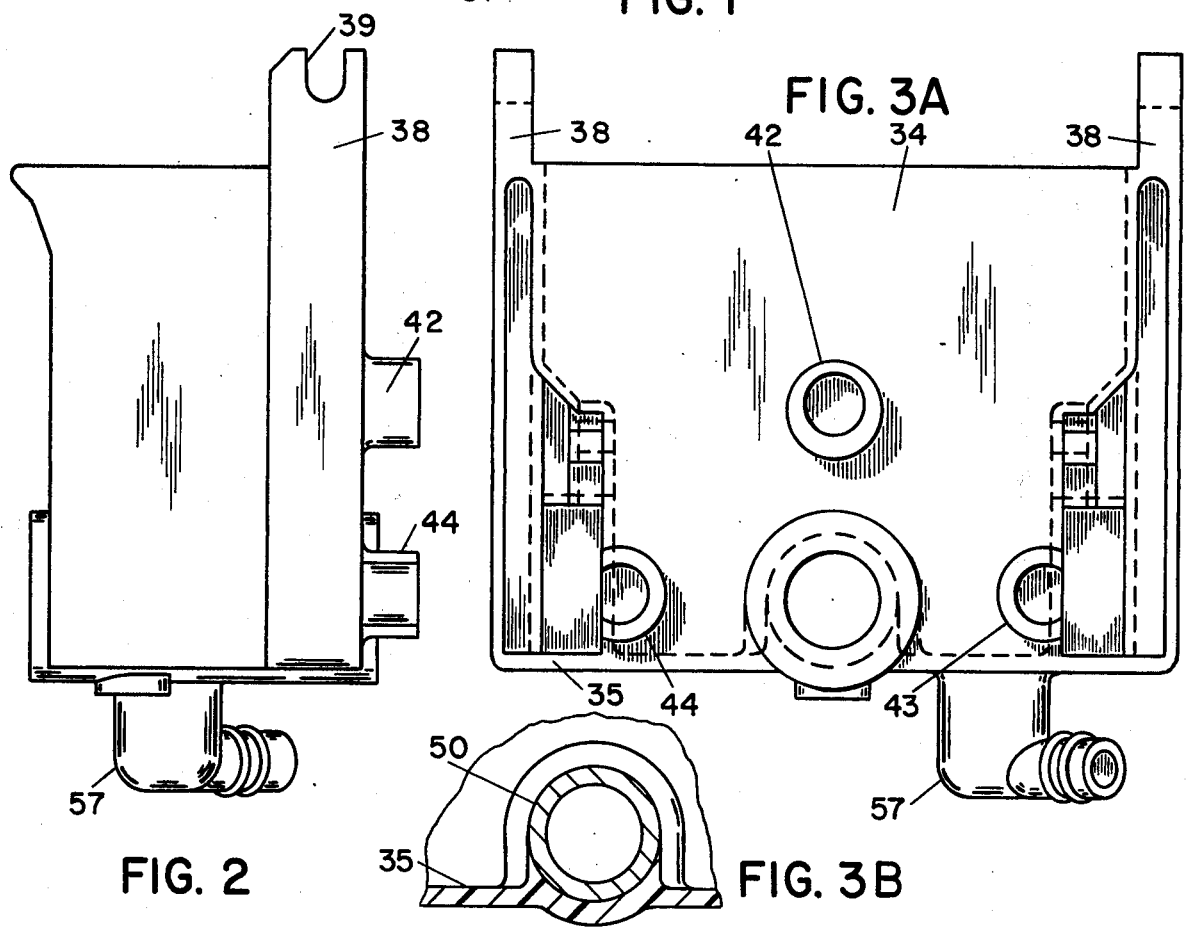

PLASTIC, HEATED WATER CONTAINER FOR TAPE MACHINES

BACKGROUND OF THE INVENTION

The general shape of the tank or receptacle follows that of the older metal tanks used on machines of this kind. Hempel U.S. Pat. No. 2,845,266 illustrates such a metal tank. It is designed to fit on the front wall of a tape dispensing machine to contain water, to fit onto a heating element to heat the water, and to support a brush to transmit the heated water by capillarity to the top of the tank, where, as the tape passes across the brush, the under gummed surface of the tape is moistened for application to an object such as a carton.

A problem with the tanks, of metal, usually zinc, is that they have a serious corrosion problem. This is thought to be increased by the fact that they are subjected to localized heating and contain water as an electrolyte.

An additional problem with the metal tank is that it is relatively difficult to clean, in that deposits from the water adhere tightly to its surfaces. The plastic tank is easier to clean, as the deposits can easily be removed from its surfaces.

A further problem with this type of tank is that the metal conducts heat well, and, being in close association with the heating element, causes the whole receptacle to become hot to the touch and capable of burning a user who touches it inadvertently.

Prior efforts to make plastic receptacles have failed, although plastic, being a relatively poor conductor of heat, does not afford the burning hazard of metal receptacles, and is also not subject to the corrosion problems of the metal tanks. It is necessary for efficiency of the heater to have a good heat conduction from the heating element that projects from the front wall of the tape machine into the water within the receptacle. It is also necessary to have the receptacle watertight so that it will not leak the water. Prior efforts with plastic receptacles have failed to combine good heat conduction and good strength, with absence of leaking.

THE NATURE OF THE PRESENT INVENTION

The applicant has found that a plastic tank can be made that takes adequate care of the corrosion problem, is easy to clean, reduces the hazard of burning the user, and yet which provides good heat transfer from the external heating elements into the water in the tank. It comprises an insert of metal put into a plastic tank, the plastic being molded around the insert, and the parts being formed in such a way that the metal insert will transmit heat from the heating element to the interior of the cup, but it will not permit leakage around the ends of the metal insert.

More specifically, the metal insert is tubular and extends through the plastic cup from back to front so that it can fit over and embrace a metal heating element projecting from the front of the tape dispenser. The metal of the tubular insert can then transmit heat readily to a limited area of the water in the cup without excessively heating the plastic of the cup itself. To prevent the leakage around the ends of the insert, means are provided to counteract the effect of unequal expansion of the metal and the plastic both radially and axially of the tubular insert. To this end there is means to dispose plastic of the cup across both ends of the tubular metal insert, and also to project plastic into peripheral or circumferential grooves in the outside wall of the metal insert adjacent the ends thereof.

OBJECTS OF THE INVENTION

The objects of the invention are those embraced within the foregoing description, and are especially to provide a plastic water receptacle for the front of the tape machine that can afford efficient heating of the water therein from a heating element, will not leak, and yet will not cause the burning problem present with metal receptacles.

IN THE DRAWINGS

FIG. 1 is a front elevation of the tank;

FIG. 2 is a side elevation thereof taken from the right side of FIG. 1;

FIGS. 3A and 3B are rear elevations partly in section;

DESCRIPTION OF THE PREFERRED EMBODIMENT

Figure 5:
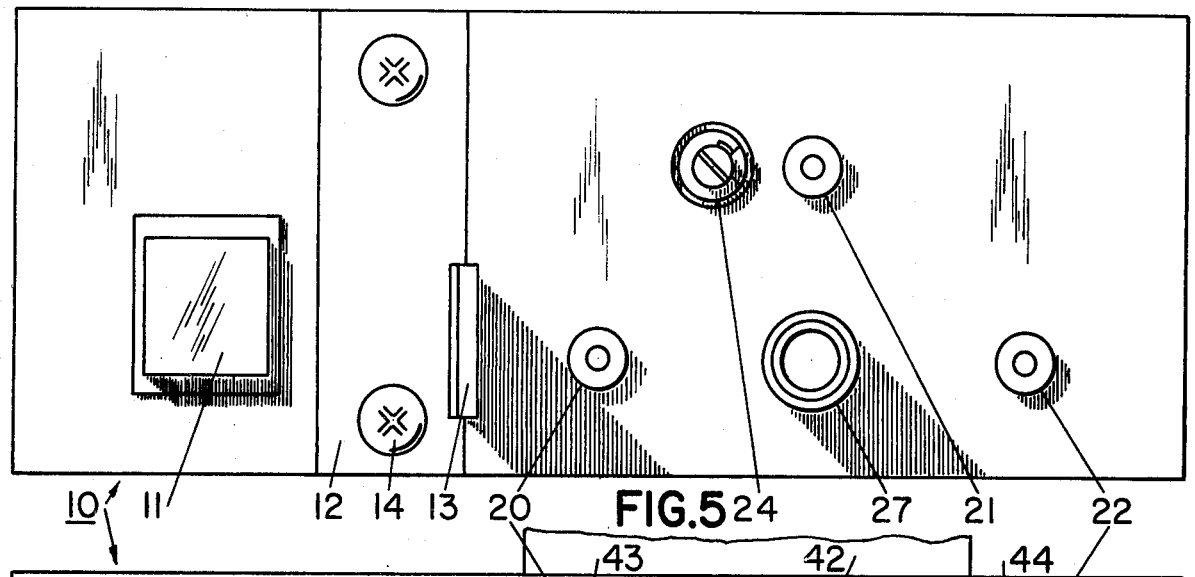
FIG. 5 is a view of the panel for the front wall of the machine.
Figure 4:
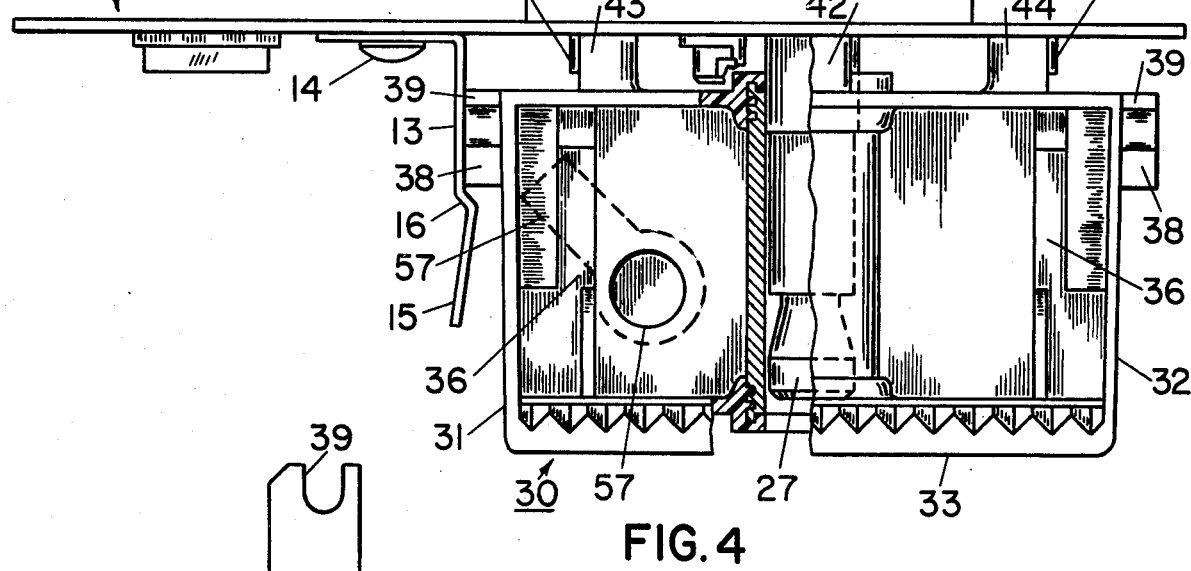
FIG. 4 is a top view showing the tank partly cut away and also showing it attached to a panel for the front wall of the machine.

Referring to FIGS. 4 and 5, a typical front wall of the machine includes a panel 10 having a main starting switch 11 thereon. It also has a metal spring clip 12 having a latching member 13 projecting therefrom. The spring clip is attached to the front panel by screws 14. The clip has its end bent outwardly and has a latching shoulder 16.

The panel also has three positioning buttons 20, 21 and 22 firmly secured to it and projecting a short distance forwardly. It also has a thermostatic adjustment 24 projecting from it, the latter projecting only so far as the positioning buttons 20–22 project.

A generally cylindrical heating element 27 projects forwardly from the front wall of the panel 10. In the illustrated example, it is approximately ⅜ of an inch in diameter.

The plastic tank or receptacle generally indicated at 30 is preferably box-shaped and open-topped, with side walls 31 and 32, front wall 33, back wall 34, and bottom 35. As shown in the Hempel patent above referred to, the receptacle is designed to accept a brush and to hold the same with the bristles sloping upwardly and projecting above the top of the receptacle. To this end the plastic has shoulders 36 molded in its opposite sides. The back view in FIG. 3 shows cavities that are formed in the plastic molding operation to save on plastic material and to aid in heat insulation of the exposed walls.

The receptacle 30 has also integrally molded columns 38 on its opposite sides. These project above the top of the receptacle and have hinge notches 39 that can receive pins on a top member for purposes that are shown in the Hempel patent.

The back wall 34 has projections 42, 43 and 44 extending backwardly therefrom. These include one cylindrical projection 42 that is positioned to engage over the button 20 on the panel 10 and to fit fairly closely therewith. There are two partially-cylindrical projections 43 and 44 that are designed to engage the projecting buttons 21 and 22, respectively, thus aiding in positioning and securing the receptacle in place on the panel 10. Additionally, there is an opening to be described to receive the heating element 27.

When the receptacle is to be placed on the front panel, it is slipped over the heating element 27 and pressed backwardly positioning it so that the partially-cylindrical guides 43 and 44 engage their respective buttons 21 and 22 and the cylindrical guide 42 engages over the button 20. In this action of pushing the receptacle back into place, the column 38 on the left side of FIG. 4 will engage the outwardly sloping spring tongue 15, forcing it outwardly and then snapping behind the shoulder 16. The tongue thus holds the receptacle in place.

As noted heretofore, the receptacle is to hold water that is to be heated by the heating element 27. This element is metallic on the exterior, preferably being made of brass. The tank 30 is provided with a brass sleeve 50 that is positioned to fit over the heating element 27 with a fairly close, but freely slidable, fit. The brass sleeve or tube 50 is molded as an insert in the plastic receptacle 30. It is exposed over most of its upper surface to the interior of the receptacle so that water therein can be in direct contact with it. This enables the tank to have efficient heating of the water, but yet to have the cool quality of plastic.

Figure 7:
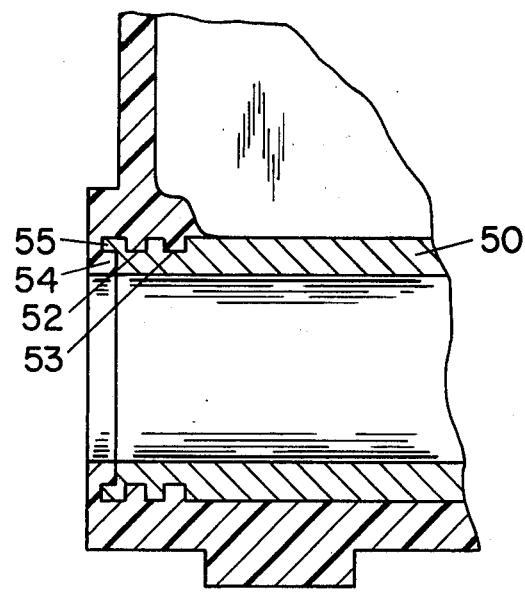
FIG. 7 is an enlargement of the lower left-hand corner of the sectional view of FIG. 6.

A problem arose in connection with the difference in expansion and contraction of the plastic and the metal, leading to leakage. Leakage has been overcome in the present case by having both peripheral and endwise engagement maintained between the plastic and the tubular insert 50. FIG. 7 is an enlarged illustration of these features at one end of the tube 50.

There are two circumferential grooves 52 and 53 surrounding the outside of each end of the insert 50. In addition, there is an undercut or rabbeted recess 54 in each end of the tubular insert 50. The insert may be made of brass, is mounted in the mold so that the plastic can be molded around both ends of the insert, filling, as is shown, the two circumferential grooves 52 and 53 at each end, extending around both ends of the insert and the rims 55 thereof, and also filling the recesses 54 at both ends. A typical plastic to use is glass-filled nylon with 30% glass in it.

Figure 6:
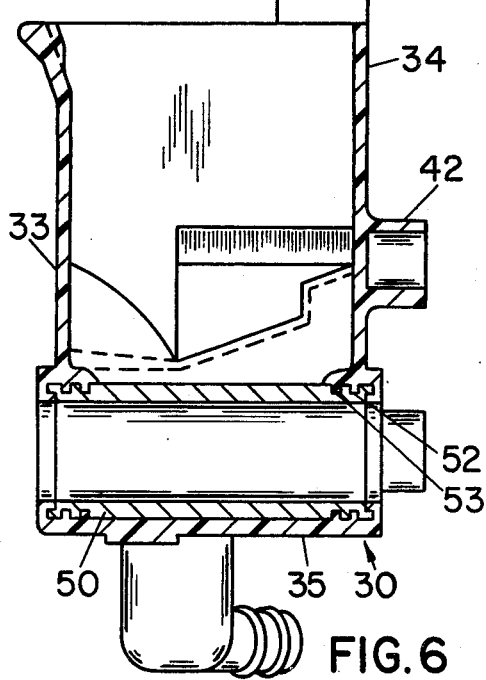
FIG. 6 is a vertical section on the line 6—6 of FIG. 1.

Considering FIG. 7, in combination with FIG. 6, if the cylindrical brass insert 50 expands axially or lengthwise at a greater rate than does the plastic surrounding its ends, it will compress itself against the overlying plastic that is within the grooves 54 and maintain a seal. If on the other hand, the insert 50 contracts more than does the plastic, then the plastic within the two peripheral grooves 52 and 53 will be pressed against the walls of those grooves and the seal will be maintained. If the brass expands radially more than does the plastic, it will force its peripheral surfaces against the plastic to maintain the seal. This can be any of the surfaces on the outer part of the cylindrical member 50, including those within the grooves 52 and 53. If the insert 50 contracts more than does the plastic, then the overhanging outer rim 55 on the end of the insert 50 will compress itself against the plastic within the groove 54 and maintain a seal.

Thus applicant has succeeded in providing a means to maintain a seal between the brass insert and the plastic despite the possible variations in expansion and contraction in both axial and radial directions.

A water connection 57 is molded into the bottom of the tank 30. It is to be connected by a tube, usually flexible, to a water supply that is regulated to provide a constant level of water in the tank 30. The level should be kept over the level of the thermostat 24. Use:

In use, the receptacle is fitted over the projecting heating element 27 that extends from the front wall of the tape dispensing machine until the guide members 42, 43 and 44 slip over the projecting buttons 20, 21 and 22, respectively. In this operation, the retaining clip 13 will engage the column 38 to retain the receptacle in place against inadvertent removal.

The water connection 57 is connected by a rubber hose to an appropriate water supply. The thermostat device 24 is adjusted to maintain the desired temperature of the water. This thermostat controls a switch that regulates the energization of the heating element, subject to the closure of the main switch 11.

The brush (not shown) is placed into the receptacle. Its bristles extend out the top and are maintained in a distributed condition by the grooves in the upper front edge of the front wall 33. The lower end of the brush is immersed in water.

The water covers the upper surface of the insert 50 in direct contact therewith. It also has fairly close relationship to the lower part of the insert, although the plastic comes up on that as shown in FIG. 3 in order to permit it to be molded. The insert tube 50 has a fairly close fit on the heating element 27 so that heat is efficiently conducted by the metal tube 50 to the water. On the other hand, the heat is not in direct contact with the plastic over the whole of the metal insert and has little contact with the plastic in the upper portions of the receptacle. Owing to the fact that plastic is a poor conductor of heat, the receptacle dissipates the heat rapidly and does not remain in a condition to burn the user. Thus applicant has made a tank that minimizes corrosion, controls the heat problem, and yet provides efficient heat conduction, without leaking.

It will be understood that the gummed tape is drawn out across the top of the brush where capillary action supplies water to the gum on the tape permitting the tape to be applied directly to a carton or other item.

Various changes and modifications may be made within this invention as will be readily apparent to those skilled in the art. Such changes and modifications are within the scope and teaching of this invention as defined by the claims appended hereto.

What is claimed is:

1. In a tank for a tape dispensing machine or the like: the tank being adapted to hold liquid, and to engage a heating element that is external to the tank device to heat the liquid; the tank being of plastic material of relatively low heat conductivity; and a metal member of relatively high heat conductivity molded into the plastic tank, the metal member being in the lower part of the tank so as to be below the liquid level thereof, and constituting a wall portion for the tank exposed on one side to the interior of the tank and on the other side to the exterior thereof, and means including embedding of an end of the wall portion in the plastic to prevent leakage from the tank around the end of the metal wall portion, the plastic extending continuously around the edge of the metal member, the plastic and the metal member having interengaging surfaces at said end affording resistance to relative movement in all directions, between the plastic and the metal, to avoid separation of the metal member and the plastic that could permit leakage.

2. In the tank of claim 1, the metal member having at least one groove filled by the plastic in one surface of the metal, and the plastic also extending around to be disposed against the opposite side of the metal member.

3. In the tank of claim 1, the metal member extending across the lower part of the tank and being embedded in the plastic at its opposite ends, with its intermediate parts exposed internally and externally of the tank; the plastic extending continuously around both ends of the metal member and both ends of the metal member having the aforesaid interengaging surfaces with the plastic.

4. In the tank of claim 3: the metal member being tubular, and the plastic at the ends of the member surrounding the member but leaving at least one of the member open so that the metal member can fit over the heating element.

5. In the tank of claim 4: both ends of the metal member being open, and being similarly interengaged with the plastic.

6. In the tank of claim the metal themetal member having a rabbet cut-out opening into its end and inner surface, and having at least one groove around its outer surface filled with plastic.

7. In the tank of claim 6: both ends of the metal member being similarly formed with rabbet and groove filled with plastic.

8. In the tank of claim 7: there being two grooves around each end of the metal member, both being filling with plastic.

9. In the tank of claim 2: the tank having integral angularly disposed shoulders on its walls below its liquid level to receive and support a brush.

10. In the tank of claim 9: the shoulders being inset from opposite walls of the tank, with recesses between them and the side walls to aid in insulating the side walls from heated water in the tank.

* * * * *